Dec. 22, 1953  F. NIEBURG  2,663,186
FUEL-DISTANCE METER
Original Filed Sept. 5, 1944
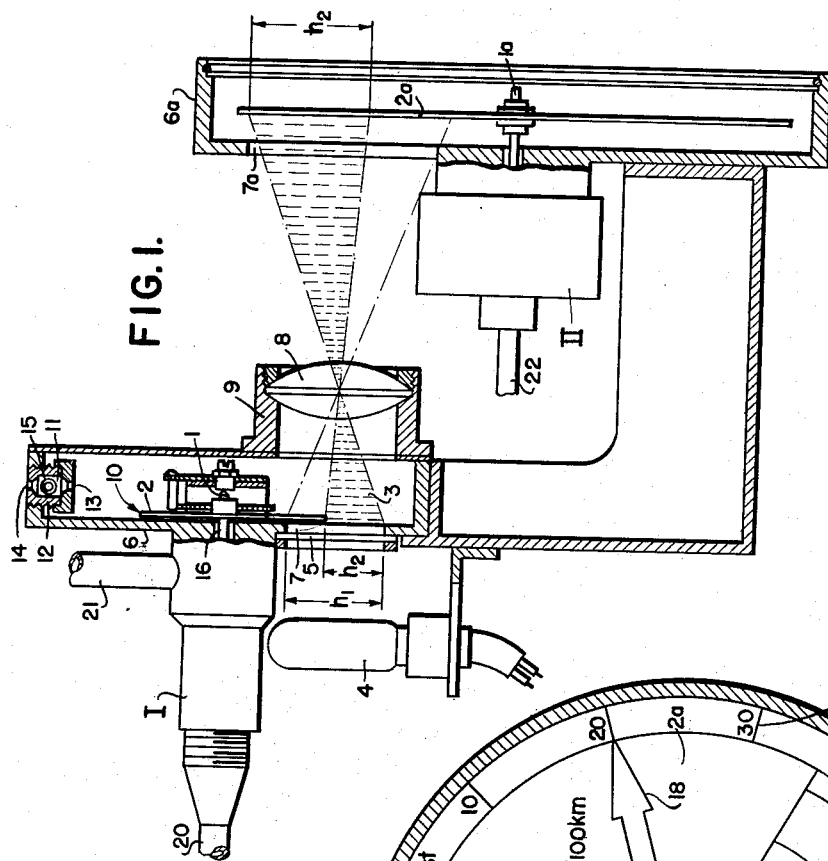
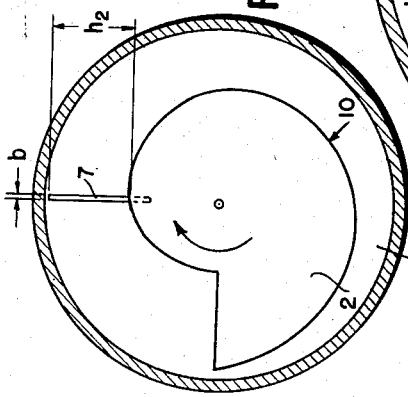
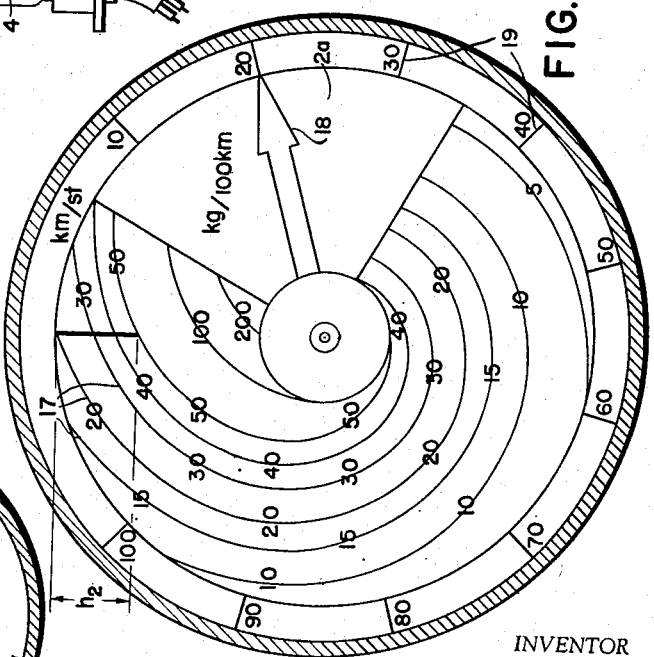
INVENTOR
Felix Nieburg
BY Wenderoth, Lind & Ponack
ATTORNEYS Patented Dec. 22, 1953

2,663,186

UNITED STATES PATENT OFFICE 2,663,186

FUEL-DISTANCE METER

Felix Nieburg, Stockholm, Sweden

Original application September 5, 1944, Serial No. 552,757. Divided and this application July 25, 1949, Serial No. 106,726

3 Claims. (Cl. 73—114)

This application is a division of my prior application, Serial No. 552,757, filed September 5, 1944 now abandoned.

The main object of the present invention is to provide a measuring device for measuring the specific fuel consumption of an engine driven vehicle. A further object of the invention is to provide a fuel-distance meter for measuring the specific fuel consumption per unit of distance travelled by an engine driven vehicle.

Particularly, it is one object of the invention to provide an apparatus in which the necessary transfer of the measuring values of the fuel consumption and of the distance is affected without any substantial mechanical friction (i. e. without the use of mechanical transferring members movable under frictional resistance) into the composed measuring result, the calculating operations required for this purpose being effected by the action of a ray or band of light, according to the deflection of the respective measuring apparatus.

With special advantage the invention may be applied to the measuring of the specific fuel consumption of power engines driven by liquid or gaseous fuels, for instance internal combustion engines, and may be used for vehicles driven by such engines as well as for stationary plants. Also a continuous registering of the measuring results obtained may be effected. By the use of a quantity-meter for the fuel and a speedometer for the vehicle it is, for instance, possible according to the invention to obtain a direct indication of the (instantaneous and average) fuel consumption per road unit. Average fuel consumption per road unit is the mean quantity of fuel consumed per distance of road selected as a unit of distance. If, on the other hand, a powermeter is used, an indication of the fuel consumption per horse-power-hour may be obtained. The invention gives many possibilities of such composed measurements according to the measuring apparatus used. To facilitate an explanation of the properties of the subject matter of the invention there will, however, in the following be describtbed an example of the application of the invention to the determination of the fuel consumption per distance unit of vehicles driven by internal combustion engines, use being made of a quantity-meter and a speedometer. By automatic division of the indicated values obtained by these meters it is possible to ascertain continuously the specific fuel consumption.

It may be said that known devices of the kind referred to cannot be used in practice, because the indications of the liquid-quantity-meters used, to a comparatively high degree, are dependent on the viscosity of the liquid to be measured and thus also on the actual temperature, so that incorrect measuring results are obtained and, moreover, no direct and momentary reading of the final results is possible. Thus, the problem inherent to the present invention has not hitherto been solved.

The present invention solves this problem in a wholly satisfactory manner due to the fact that the influence of viscosity on the indication is, from the beginning, excluded by the use of a quantity-meter which consists of rotatable guide surfaces arranged in the liquid conduit and actuated by this liquid and which, thus, for the measuring of the liquid quantity utilizes the principle of the torque equation of mechanics of fluids, in whch the torque is practically independent of the temperature of the fuel liquid. As already mentioned, the division of the two measuring values is effected, according to the invention, without the use of mechanical transferring members.

In practice, it has proved as especially suitable to ascertain the measuring values of the two measuring apparatus optically by means of rays of light which are adapted to impinge on or to intersect curves arranged on the indicating discs of the two measuring apparatus, said discs moving in accordance with the deflections of the apparatus. The measuring values of the two measuring apparatus are obtained by this cooperation of the rays of light and the curves without the assistance of mechanical transferring members, the operation thus being absolutely correct.

For carrying out the invention optically the curve discs of the quantity-meter and the speedometer are arranged behind each other in the path of a ray of light. Of these curve discs one partly covers or screens the band of light from one of its sides in accordance with the logarithm of one measuring value, while the other curve disc partly covers or screens the band of light from the other side in accordance with the logarithm of the other measuring value, so that the remaining height of the ray of light represents the logarithm of the specific fuel consumption. In this way the two apparatuses may be arranged in any desired manner in the space, it being possible to convey the ray of light from one apparatus to another. Mechanical transferring members between the apparatus and the discs may, therefore, be omitted. Furthermore, a completely parallax free reading my be ensured.

A simplification of the indicating device is made possible by providing the curve disc, at the same time serving as a reading disc and finally hit by the band of light, with a reading scale in the form of logarithmically determined curves.

An increase of the reading scale, the amount of space being unchanged, may be obtained by arranging the curve disc of one measuring apparatus partly to screen or cover the band of light from one of its sides in accordance with the logarithm of one measuring value, while the reading disc of the other measuring instrument is transparent or light-pervious within the sector of its torsional deflection and has a reading scale consisting of logarithmically determined curves cutting the remaining ray of light in accordance with the logarithm of the second measuring value.

The accompanying drawings illustrate some embodiments of the invention as examples.

Figure 1 shows a longitudinal section of a device according to the invention,

Figure 2 is a plan view of a curve disc (indicating disc) of one of the two measuring instruments, Figure 3 shows an embodiment of the reading disc.

Figure 1 shows diagrammatically an embodiment of the invention. The fuel consumption meter consists chiefly of a quantity-meter I and a speedometer II, both of any suitable construction, the indications of which are effected by turning the indicator shafts 1 and 1a. Indicator discs 2 and 2a, respectively, are fixed to the indicator shafts, said discs being turned in accordance with the deflections of the shafts. For indicating the measuring values in a completely frictionless manner there is used a band or ray of light 3 emitted from a lamp 4. The ray passes through a transparent disc 5 and through narrow window slits 7, 7a which are provided in the casings 6, 6a embracing the discs 2, 2a, said slits serving as slit diaphragms to limit the width $b$ (Fig. 2) of the ray. The slit 7 restricts the maximum height of the ray or band 3 to the value $h_1$. Right in front of the window slit 7 there is provided a lens 8 which is mounted in a tube 9 and simultaneously seals the casing 6 filled with liquid.

Figure 2 shows the outer contours of the indicator disc 2. This disc is impervious to light and with its curve-shaped contour line 10 it intersects the band of light 3 projected from the slit-shaped windows 7, so that only the height $h_2$ of the band of light 3 is left to proceed after the disc 2.

The liquid fuel flowing from the fuel tank to the engine enters the liquidmeter I through a conduit 20 and after having passed through the measuring device, it escapes through a conduit 21. According to the magnitude of the quantity of fuel passing the meter per unit of time, the indicator shaft 1 and the indicator disc 2 are turned in the direction indicated by the arrow in Figure 2.

According to one embodiment the quantity-meter comprises a small turbine blade wheel which has double-bent guide surfaces in the form of blades and is rigidly attached to the shaft 1 running easily (preferably journalled between points and in jewel bearings). The inner end of a helical spring is also fixed to the shaft. The outer end of this helical spring is rigidly fixed to the casing 6. When flowing through the turbine blade channels of the small wheel the flow of liquid is subjected to a change of direction so that a torque is exerted on the said small wheel. The size of this torque may be calculated according to the impulse law or reaction law of mechanics of fluids. As is well known, the torque of reaction may be calculated according to the following formula:

$$Md = r \cdot M/S \cdot (C_{u1} - C_{u2})$$

In this formula $r$ designates the radial distance between the turbine blade channels and the shaft, $M/S$ the quantity of liquid passing through the meter per second, and $C_{u1}$ and $C_{u2}$ the peripheral components of the velocity of flow at the beginning and the end respectively of the turbine blade channels. As will be seen from the equation, the size of the moment of reaction, which is a measure of the quantity flowing through the meter, is independent of the viscosity of the liquid. As known, however, the viscosity of liquids is highly dependent on the temperature. Therefore, quantity-meters of this kind, which consist of rotatable guide surfaces arranged in the liquid conduit and actuated by the liquid, have the great advantage that their indication is highly independent of the actual temperature.

Under the influence of the exerted torque the shaft 1 is turned or rotated, and simultaneously it loads the said helical spring so much that the torque exerted by the spring is in equilibrium with the torque exerted by the flow of liquid. The rotation thus effected is a measure of the amount of liquid or of the mass of liquid or the volume of liquid respectively, flowing through the meter per unit of time.

The curve disc 2 is so constructed that upon rotation its periphery 10 screens the ray of light so much that the remaining height of ray $h_2$ indicates, on a suitable scale on the disc 2a, the logarithm of the numerical value of the quantity of liquid passing through the meter and corresponding to the deflection.

As a speed indicator there may be used a tachometer II to which, by means of a shaft 22, is imparted a rotary motion corresponding to the speed of the vehicle.

Figure 3 shows an embodiment of the reading disc 2a. The disc is pervious to light within the total sector for the torsional deflection and provided with reading curves 17. The disc is rotated by the shaft 1a of the speedometer or tachometer II. The curves are shaped on a logarithmic base and are provided with scales. In the primary scale, the temporary radial distance between a curve and the edge of the disc is equal to the logarithm of the numerical value of the fuel consumption (accurately expressed, this distance is equal to the difference between the logarithms of these numerical values of the fuel consumption which are represented by the curve). Therefore, the curves 17 represent the reading scale of the apparatus, the scale division consisting of curves. The curves are designated by figures which, in the same manner as in a calculating rule, indicate the number of the logarithm. The reading takes place in such a manner that the consumption of fuel per distance of road corresponds to the numerical value for the curve touching the other end of the ray of light. The distance of each curve from the center of the disc decreases at a progressive turning, with the logarithm of the corresponding increase of speed. Hence, the curves are parallel to each other. In this way the same scale length is available at low as well as at high speeds, whereby a larger range of measurement is rendered possible with the same size of the disc. The disc carries a pointer 18 movable with the same, said pointer also indicating the travelling speed on a stationary scale 19 which is provided on the casing 6 of the speedometer. The inner boundary of the height $h_2$ of the light ray is determined by the disc 2. The reading is effected by determining the number of the curve touching the inner boundary of the height $h_2$ representing the ray of light. The remaining band of light having the height $h_2$ is reproduced by the lens 8 on the disc 2a in magnification. Therefore, the radial deflections made by the edge 10 of the disc 2 may, in accordance with the optical magnification, be smaller than is required in consequence of the construction of the reading disc 2a. Thus, the whole disc 2 may be made considerably smaller, which involves a relief of the shaft of the quantity-meter I and thus a reduction of the frictional resistances in the bearings.

The curves of the disc 2a are shaped in such a manner that, after the speedometer (tachometer) II having adjusted itself to a certain deflection, the height $h_2$ according to Fig. 3 corresponds to the logarithm of the numerical value of the speed of the vehicle at the moment in question. The remaining height of the ray of light, which is finally obtained, represents the difference of the two logarithms (the logarithm of the quantity of liquid and the logarithm of the speed) and thus also the logarithm of the quotient:

$$\frac{\text{Quantity of fuel per unit of time}}{\text{Distance of road per unit of time (speed)}} = \frac{\text{Quantity of fuel}}{\text{Distance of road}}$$

This fraction expresses the consumption of fuel for a determined distance of road, this being the sought magnitude. The following equation is applied:

$$B = \frac{Q}{V} \text{ and hence: } \log B = \log Q - \log V$$

B designates the consumption of fuel per distance unit (for instance in kgs./100 km. or liters/100 km.), Q the consumption of fuel per unit of time (in kgs./hour or liters/hour) and V the speed of motion (in 100 km./hour).

The remaining height $h_2$ of the ray of light read off on the scale 17 is a direct measure of the logarithm of the consumption of fuel per distance unit.

At the highest point of the casing 6 there is arranged an automatic ventilating and shut-off valve 11. This valve consists of a valve cage 12 which through passages 13 and 14 connects the space surrounding the indicator disc 2 with the atmosphere. Preferably, the mouths of the passages in the valve cage 12 are formed as conical seats. In the valve cage there is a freely movable ball valve body 15 which is so light that it floats on the surface of the fuel liquid to be measured. When the apparatus is brought into operation, the liquid flows through the remaining annular space between the shaft 1 and the surrounding surface of the bore 16 into the interior of the casing 6. The air may then escape through the ventilating valve 11, the ball 15 to some extent being raised from its lower seat by the pressure existing in the casing. If after the air having been completely displaced the liquid flows out of the casing through the passage 13 into the valve cage 12, the ball begins to float and rises with the liquid, until the ball finally reaches the upper seat, which it engages, the ball thereby shutting off the passage 14 and preventing the liquid from flowing outwardly. In operation, it may also occur that depression is produced in the fuel piping and thus also in the casing of the quantity-meter. In this case, the level of the liquid in the valve cage sinks, until the ball is brought to rest against the lower seat and in this way blocks the admission of the atmosphere to the casing.

By the invention it is rendered possible for the first time to ascertain the fuel consumption per distance by a simple direct reading of the apparatus, and hence the driver can, on one hand, at any time set the most favorable and thus the most economical driving conditions and, on the other hand, continuously form a conception of the working conditions of the vehicle.

It is quite clear that although in the foregoing description the measuring instrument II has been described as speedometer it may also be power meter measuring the power of the fuel consuming engine, particularly in the case that the engine is stationary. The power meter may also measure the power delivered by an electric generator driven by the engine. In this case the power meter may be a wattmeter.

In the case of the speedometer the invention may be applied for engine-driven vehicles of different kinds, such as auto-cars, air-crafts, airplanes, vessels, etc.

I claim:

1. A measuring device for measuring the specific fuel consumption of an engine-driven vehicle comprising in combination a quantity meter for measuring the momentary quantity of fuel consumed by the engine per unit of time, a speedometer for measuring the speed of the vehicle, means for emitting a band of light, a movable disc connected with one of said meters for rotation and having a contour shaped as a logarithmic curve arranged for screening partially the said band of light, a second movable disc having a reading scale in the form of logarithmic curves and connected with the other meter for rotation, and means for moving said discs in the path of said band of light synchronously with the deflection of the respective meter, the reading-scale disc being located behind the first-mentioned disc for the purpose of receiving, on its reading scale, the band of light partially screened by the first-mentioned disc.

2. A measuring device for measuring the specific fuel consumption of an engine-driven vehicle comprising in combination a quantity meter for measuring the momentary quantity of fuel consumed by the engine per unit of time, a speedometer for measuring the speed of the vehicle, means for emitting a band of light, a pivoted disc connected with one of said meters for rotation and having a contour shaped as a logarithmic curve arranged for partially screening the said band of light, a second disc rotatable through a limited angle and having a portion within the sector of its rotation, a reading scale on said portion in the form of logarithmic curves, said second disc being connected with the other meter for rotation, and means for moving said discs in the path of the band of light synchronously with the deflection of the respective meter, the reading-scale disc being located behind the first-mentioned disc for the purpose of intersecting the remaining band of light partially screened by the first-mentioned disc.

3. A fuel-distance meter for measuring specific fuel consumption per unit of distance travelled by an engine driven vehicle comprising in combination a quantity meter for measuring the momentary quantity of fuel consumed by the engine per unit of time, a rotating speedometer for measuring the speed of the vehicle, electromagnetic energy emitting means, a first movable curve-disc connected for synchronous motion to said quantity meter, a second movable curve-disc connected for rotation to said speedometer, means to move said first curve disc in accordance with the deflection of said quantity meter, means to move said second curve-disc in accordance with the deflection of said speedometer, said first movable disc provided with means to intercept a portion of the electromagnetic energy emitted from said emitting means, said second movable curve-disc intercepting a portion of the electromagnetic energy, means provided on said first movable disc to vary the electromagnetic energy value passed by said disc in accordance with the logarithm of the quantity measurement and means provided in operative relationship to said second movable disc to measure the electromagnetic energy value in accordance with the logarithm of the speedometer measurement.

FELIX NIEBURG.

References Cited in the file of this patent

UNITED STATES PATENTS

| Number | Name | Date |
|---|---|---|
| 1,401,315 | Clark | Dec. 27, 1921 |
| 2,277,285 | Woodling | Mar. 24, 1942 |